No. 815,208. PATENTED MAR. 13, 1906.
W. J. O'DONNELL.
HEAT APPLYING DEVICE.
APPLICATION FILED MAY 22, 1905.

Witnesses
C. Munter
J. H. Griesbauer

Inventor
W. J. O'Donnell
by H. B. Willson
Attorney

UNITED STATES PATENT OFFICE.

WILLIAM JAMES O'DONNELL, OF ROCHESTER, NEW YORK.

HEAT-APPLYING DEVICE.

No. 815,208.　　　　Specification of Letters Patent.　　　Patented March 13, 1906.

Application filed May 22, 1905. Serial No. 261,650.

*To all whom it may concern:*

Be it known that I, WILLIAM JAMES O'DONNELL, a citizen of the United States, residing at Rochester, in the county of Monroe and State of New York, have invented certain new and useful Improvements in Heat-Applying Devices; and I do declare the following to be a full, clear, and exact description of the invention, such as will enable others skilled in the art to which it appertains to make and use the same.

This invention relates to improvements in devices for applying heat to the hoofs and legs of horses or other animals.

The object of the invention is to provide a device of this character whereby an intense heat may be applied to affected parts of the hoof or other parts of a horse, by means of which the diseased conditions of these parts may be sweated out.

A further object is to provide a device of this character adapted to be applied to the hoofs or other parts of a horse having means whereby a continuous circulation of steam or hot water may be maintained therein, thus keeping up a steady even heat to act on the affected parts.

With the above and other objects in view the invention consists of certain novel features of construction, combination, and arrangement of parts, as will be hereinafter described and claimed.

Figure 1:
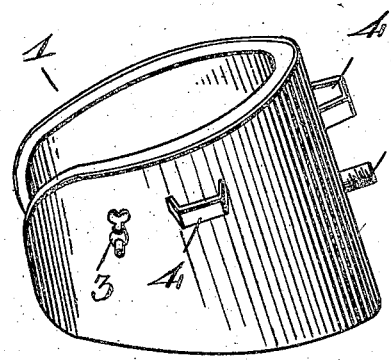
Figure 3:
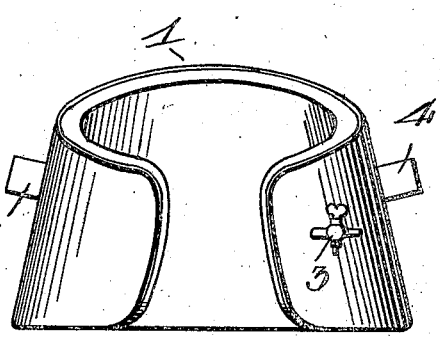
Figure 4:
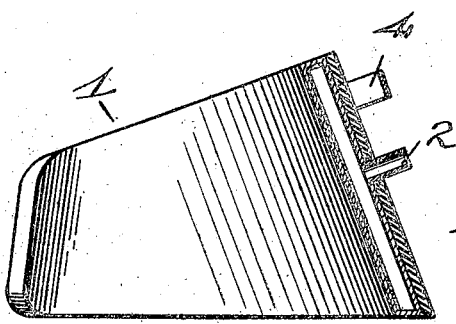
Figure 2:
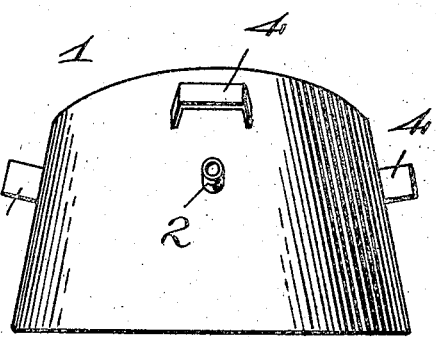

In the accompanying drawings, Figure 1 is a perspective view of the heat-applying device. Fig. 2 is a front view. Fig. 3 is a rear view, and Fig. 4 is a vertical longitudinal sectional view of the same.

Referring more particularly to the drawings, 1 denotes a heating device, which is preferably in the form of a flat hollow receptacle, preferably constructed of sheet metal and so shaped as to conform to the parts to which the same is to be applied, said device being here shown as adapted to fit the hoof of a horse. In the front wall of the receptacle midway between the ends of the same is arranged a nipple 2, which is adapted to be connected to the end of a steam or hot-water supply pipe. (Not shown.) Arranged in the receptacle near one end of the same is a valve discharge-cock 3, through which the steam or hot water may be permitted to pass when circulating through said receptacle. On the outer wall of the device is also secured a series of loops 4, through which retaining-straps are adapted to pass, said straps being secured to the ankle of the horse in any suitable manner. Around the outer side of the receptacle are placed several layers of asbestos to prevent the escape or radiation of heat from the same.

In applying the device to the hoof of a horse a flannel bandage is first applied thereto, said bandage having been previously saturated with glycerin. The heating device is now slipped down over the pastern or fetlock and onto the hoof. The retaining-straps are now applied and connected to said heating device to hold the latter in place, after which a heavy asbestos bandage, preferably four inches in width and five yards long, is wound and rewound around and above and below the heater until the same is entirely covered and the affected parts are placed in a practically air-tight cover, suitable wads or pads being inserted beneath the asbestos wrapping to fill in the irregular parts of the foot or ankle around which the bandage is wrapped. A steam or hot-water supply pipe is now connected to the nipple 2 and a supply of steam or hot water conducted thereby into the receptacle. Said steam or hot water after circulating through the receptacle may be permitted to pass out through the discharge-cock 3, thus maintaining a steady and even heat within the receptacle. By this arrangement the horse's hoof and feet will be caused to sweat and diseased conditions of the same thereby removed. This treatment has been found of great value in many cases of lameness or soreness resulting from contraction of the hoof, spavins, side bones, splints, windpuffs, &c. After being treated as herein described the parts are thoroughly rubbed with alcohol.

A heat-applying device constructed as herein shown and described will be found to be simple, strong, and durable in construction, efficient in operation, and well adapted to the purpose for which it is designed.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what

I claim as new, and desire to secure by Letters Patent, is—

The herein-described device for applying heat to the hoofs and feet of animals, consisting of a hollow metal casing curved to fit the foot of the animal and disconnected at its ends, an inlet-cock 3, and an outlet-nipple 2 extending from said casing, and a series of loops 4 for supporting the device on the animal, and an asbestos covering secured to said casing, substantially as described.

In testimony whereof I have hereunto set my hand in presence of two subscribing witnesses.

WILLIAM JAMES O'DONNELL.

Witnesses:
WM. J. MASON,
JOHN S. KEENAN.